United States Patent [19]

Kuramoto et al.

[11] 4,348,790
[45] Sep. 14, 1982

[54] LOCKING DEVICE

[75] Inventors: Kikuzo Kuramoto; Takahiro Enoki, both of Nihonbashi, Japan

[73] Assignee: Nisso Industries Co. Ltd., Japan

[21] Appl. No.: 105,015

[22] Filed: Dec. 19, 1979

[30] Foreign Application Priority Data

Dec. 29, 1978 [JP] Japan ............................ 53-182271[U]

[51] Int. Cl.³ ...................... F16B 21/00; A43C 11/08; E05C 3/02
[52] U.S. Cl. ............................... 24/211 P; 24/232 G; 411/340; 292/238
[58] Field of Search ............ 24/211 P, 211 R, 232 R, 24/232 G; 292/238; 411/340

[56] References Cited

U.S. PATENT DOCUMENTS

| 44,321 | 9/1864 | Laly | 411/340 |
|---|---|---|---|
| 260,681 | 7/1882 | Heaton | 292/238 |
| 624,969 | 5/1899 | Peterson | 411/340 |
| 695,299 | 3/1902 | Freeland | 24/211 P |
| 702,527 | 6/1902 | Bakken | 24/211 P |
| 1,461,306 | 7/1923 | Campbell | 24/232 R |
| 1,516,347 | 11/1924 | Pataky | 411/340 |
| 1,724,637 | 8/1929 | Bergstrom | 292/238 |
| 2,299,308 | 10/1942 | Creighton | 411/340 |
| 2,607,498 | 8/1952 | Roberts | 24/232 G |
| 2,872,717 | 2/1959 | Kelley | 24/232 G |

*Primary Examiner*—Victor N. Sakran
*Attorney, Agent, or Firm*—McGlew and Tuttle

[57] ABSTRACT

A locking device is disclosed for locking a brace having an opening therethrough, which comprises a bar member adapted to extend through the opening having a groove defined therein at a spaced location from a front end of the bar member which is insertable into the brace opening. A stopping piece is rotatably mounted in the groove having a hook or abutment portion at the front end thereof engageable with a front side of the groove to limit a rotation of the stopping piece in one direction, and engaging stop and projection portions at a rear end of the stopping piece. A vertical surface is defined on the engaging stop portion for abutting the brace, to lock the brace on the bar member. The projecting portion is provided to prevent an overrotation of the stopping piece.

3 Claims, 17 Drawing Figures

LOCKING DEVICE

FIELD AND BACKGROUND OF THE INVENTION

This present invention relates to a locking device to be installed on and removed from a brace, or strut in the framework of a scaffold.

Generally, framework scaffolds are built at a work site of a building, shipbuilding, civil works, or the like, and braces and handrails are provided on the struts of the frame side, when workers are to walk on the scaffold, to maintain safety and prevent tools and broken pieces from falling during work. In the conventional method, when securing such braces and handrails onto the frame side, a locking device called a gravity lock is projectively provided in the frame side strut and the holes provided in the brace, etc. are inserted in this locking device.

In a conventional locking device of this kind, a pipe-form body or bar-form body is known and used with a stopping piece which drops, but its own weight, and is pinned swingably to the body.

In this case, the locking device having a pipe-like body is hollow and its strength is weak due to a small thickness of the tube. The tube body tends to bend or become dented when hit by other object with a resultant unsmooth swinging of the stopping piece. While the pipe-like lock device generally incorporates a spring inside, to control the movement in the stopping piece. As a result, its construction is complicated, working involves difficulty, dust enters, the movement of the stopping piece is hindered when seized due to rust and the spring tension is lost after repeated use for a long time which lowers it durability.

On the other hand, the lock device having a round bar-like body, for example, ones that having the construction as shown in FIG. 1(a) and (b), is designed so that groove 2 of any desired width is cut from the front end of bar body 1 through the center. The end of stopping piece 3 is swingably attached via rivets 4 and 5 in the groove 2. One rivet 5 is inserted in hole 6 of stopping piece 3 and stopping piece 3 moves within the range of the inside diameter of this hole 6. Stopping piece 3 descends due to its own weight when the brace is inserted into the body 1 and the stop face 7 in the rear part thereof prevents the brace from taken off.

An other example of a conventional bar-like body locking device, those shown in FIG. 2(a) and (b) are known. These are designed so that groove 9 is cut from the front end of body 8 toward the center. At nearly the center of stopping piece 10, it is rotatably supported in groove 2 via rivet 11, and stopping piece 10 turns by its own weight as the brace is inserted onto body 8 and becomes vertical as shown, thus preventing the brace from being taken off.

In the above conventional locking devices, for inserting and removing the brace, stopping pieces 3 and 10 must be pushed into grooves 2 so that one can 9 by finger tip and bring bodies 1 and 8 into their horizontal position.

The body of the above-mentioned bar-like locking device is stronger than the pipe-like locking device. It has, however, disadvantages due to grooves 2 and 9 being cut from the front end. These are as follows: (1) the body is less durable, in particularly the front end tends to be broken with a resultant hindered of movement of stopping pieces 3 and 10 thereby further making removal and installation of the brace; (2) the front end of the body tends to be narrowed due to force applied from each end of rivets 4 and 11 when rivets for holding stopping pieces 3 and 10 are caulked causing possible stopping of movement of stopping pieces 3 and 10, fabrication so as not to narrow the width is difficult, and workability is low; (3) that dust and water tend to enter grooves 2 and 9 during work and due to various reasons since the tops of grooves 2 and 9 are not covered, dust may be caught between grooves 2, 9 and stopping piece 3, 10 thereby stopping the movement of stopping piece 3, 10 causing water collection with resltant rust generation; (4) that in the construction such as FIG. 1 two rivets 4 and 5 are required and hole 6 must be drilled thus making work very difficult with resultant high cost; and (5) that in the construction as shown in FIG. 2, for inserting the brace it must be adjusted horizontal manually, making handling inconvenient, etc.

SUMMARY OF THE INVENTION

Accordingly, the first object of this present invention is to eliminate the disadvantages mentioned above and to provide a locking device with improved durability by forming the body into a round bar or polygon column having a thick part at the front end which serves as a stopper.

Another object of the present invention is to provide a locking device whose body and stopping piece are not deformed even if any other object strikes the front end thereof.

Still another object of this present invention is to provide a locking device whose stopping piece turns smoothly.

Still another object of this present invention is to provide a locking device which is free from the entry of dust and rain as well as rust generation and loading trouble.

Another object of the invention is to provide a gravity locking device for locking a brace having an opening therein comprising, a bar member insertable into the brace opening having a groove spaced from a front end of the bar member forming a thick portion at the front end of the bar member, a locking piece rotatably mounted in the groove having a rounded camphored portion at the front end thereof and an engagement portion for abutting a side of the groove, and engaging stop portion with projection at an opposite end of the stopping piece for movement into the groove to permit passage of the brace and, movement by gravity out of the groove and into engagement with the brace for locking the brace.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the Drawings:

FIG. 2b is a view similar to FIG. 1b of the locking device shown in FIG. 1a;

FIG. 3b is a side sectional view, partly in elevation of the embodiment of the invention shown in FIG. 3a;

FIG. 4b is a view similar to FIG. 3b of the embodiment shown in FIG. 4a;

DESCRIPTION OF THE PREFERRED EMBODIMENTS

Turning to the drawings, in particular, the invention embodied therein in FIGS. 3a through 11, comprise a bar member or body which has a groove defined therein for rotatably receiving a stopping piece which has shaped parts for selectively engaging a brace having an opening therein to lock the brace to the bar member.

Figure 1B:
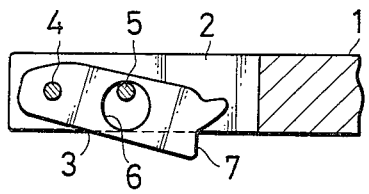
FIG. 1b is a side sectional view, partly in elevation, of the conventional locking device of FIG. (a)
Figure 1A:
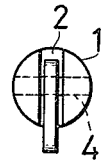
FIG. 1a is a front end elevational view of a conventional locking device.
Figure 2B:
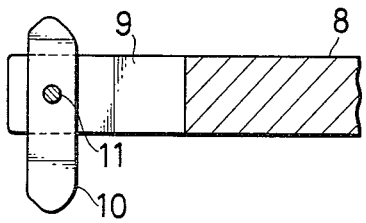
Figure 2A:
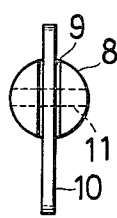
FIG. 2a is a view similar to FIG. 1a of another form of conventional locking device.
Figure 3B:
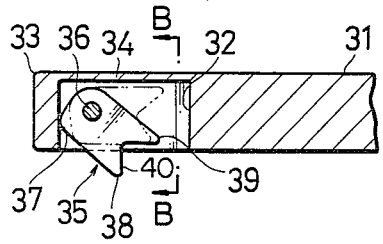
Figure 3A:
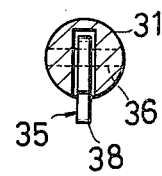
FIG. 3a is a sectional view of a locking device according to the invention.

FIG. 3(a) and (b) show an example of the invention, wherein the bar body 31 has a groove 32 in the shape of an inverted U in cross section, which opens downwardly. The front end is a solid material with a relatively thick part 33 and a thin part 34 of any desired width, provided above the groove 32 so as to prevent groove 32 from opening upwardly.

A stopping piece 35 is rotatably supported via a rivet in groove 32. The front end of this stopping piece 35 is chamfered in a curved form with a hook piece 37 projecting slightly upwardly provided at the left end. An engaging stop piece 38 and hook piece 39, which can project downwardly from groove 32, are projectingly provided at the lower end of stopping piece 35 and a vertical surface is formed at one side end of the engaging stop piece.

According to the above locking device, in the stationary state the engaging stop piece 38 is maintained in the condition shown in the drawing wherein the engaging stop piece 38 projects vertically downward from the groove 32 due to its own weight. While, the body 31 is held in position by means of welding or other suitable means onto the frame of a frame scaffold by the method shown in FIGS. 8 thru 11 and horizontally projects therefrom, as shown. Under the above conditions, when, for example, the front end is inserted onto the body 31 through the hole of brace (or others), the engaging stop piece 38 is pushed in the counterclockwise direction by the side of the brace thereby forcing the stopping piece 35 to enter the groove 32 in its entirety. The hole of the brace is thus inserted over the body 31 without interference, and is held by the body 31. As the brace is inserted toward the end of the body 31, the stopping piece 35 descends due to its own weight while turning clockwise and the engaging stop piece 38 projects vertically downwardly from the groove 32 once more. When the brace moves toward the front end of the body 31 due to vibration and other reasons during work, the side of the brace contacts the vertical surface of the engaging stop piece 38 thereby pressing the stopping piece 35 in the clockwise direction, but the rotation is stopped as a result of the abuttment of the hook piece 37 of stopping piece 35 against the inside of the thick part 33 in the groove 32. For this reason, the brace is held in contact with the vertical side 40 of the engaging stopping piece 38 and cannot go outside the body 31. Furthermore, when the stopping piece 35 is pressed in the counterclockwise direction by the brace or any other cause, the hook piece 39 is hooked to the top surface of the groove 32, overrotation is prevented. Piece 35 is so designed that in the stationary state the engaging stop piece 38 can always fall below the groove 32 due to its own weight.

The thick part 33 strengthens the body and its inner surface serves as a stopper cooperating with the hook piece 37.

For removing the brace from the body 1, the engaging stop piece 38 is pushed by a finger tip in advance to turn the stopping piece 35 counterclockwise and the body 1 is removed with the engaging stop piece 38 being held in the groove 32.

Figure 4B:
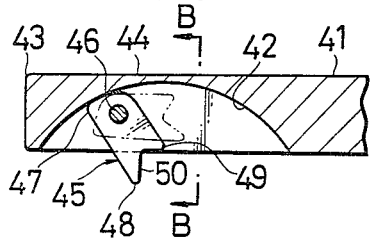
Figure 4A:
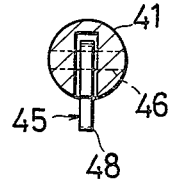
FIG. 4a is a view similar to FIG. 3a of another embodiment of the invention.

FIG. 4(a) and (b) show the other example of this invention.

In this example, a semicircular groove 42 is cut upwardly in the bar-like body. A thick part 43 is formed at the front end and thin part 44 is formed above the groove 42. The stopping piece 45 is rotatably supported in the groove 42 via rivet 46. The front end of stopping piece 45 is chamfered in a semicircular form with a hook piece 47 formed at one end and an engaging stop piece 48 and hook piece 49 formed at the other end, In its stationary condition, the engaging stop piece 48 falls due to its own weight as shown, and projects downwardly from the groove 42 with the vertical side 50 at the side end facing the back part. In this case, when the brace is inserted, the stopping piece 45 turns counterclockwise thereby allowing the insertion of the brace and once the brace has been inserted, the engaging stop piece 48 stops the brace A from being removed. The hook piece 49 is for preventing overrotation of stopping piece 45 and the other hook piece 47 is for preventing the engaging stop piece 48 from making a further clockwise turn away from the vertical position when the stopping piece 45 contacts the inside of the groove 42 as it is pressed (forced) in the clockwise direction.

Figure 5B:
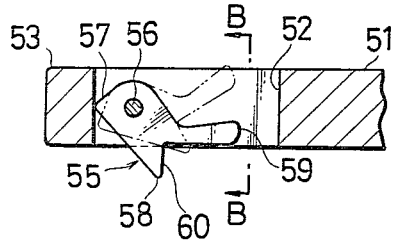
FIGS. 5a and 5b are views similar to FIGS. 4a and 4b, respectively, of another embodiment of the invention.
Figure 5A:
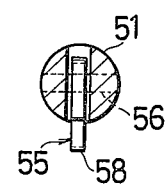
Figure 6:
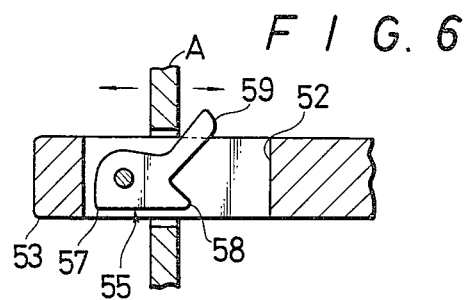
FIG. 6 is a view showing a brace having an opening therethrough to be locked by the locking device according to the invention which shows the operation of the embodiment shown in FIGS. 5a and 5b.

FIG. 5(a), (b) and (c) illustrate other example of this invention. A vertical groove 52 running from the bottom to the top is cut at the center of the body 51, a relatively thick part 53 which serves as a stopper is provided at the front end. The stopping piece 55 is rotatably supported by a rivet 56 at the center of the groove 52. The stopping piece 55, which is chamfered to form a curved front end, has a hook piece or abutment portion 57 formed at one end, with an engaging stop piece or portion 58 having a vertical face 60 provided at the rear end. A push-in piece or pojection 59 projects in the horizontal direction from stopping piece 55 in its stationary state and engaging stop piece 58 projects from the groove 52 downwardly as shown and is so designed that when the brace is inserted, the stopping piece 55 is turned counterclockwise without any resistance, into the groove 52. The engaging stop piece 58 is dropped vertically by its own weight after the brace insertion and the brace is hooked onto the vertical side 60 of the engaging stop piece 58. Even when, for some reason, the stopping piece 55 overrotates and the engaging stop piece 58 stops in the groove 52 as shown in FIG. 6, it is designed that with the push-in piece 59 projecting from the top end of the groove 52 the end face of the brace A hits the push-in piece 59 when the brace A is inserted under this condition thereby turning it clockwise and the engaging stop piece 58 projects below the groove 52 after brace A is inserted. The hook piece 57 engages the inside of thick part 57 when the engaging stop piece 58 is positioned vertically and serves as a stopper for preventing clockwise overrunning of stopping piece 55.

Figure 7B:
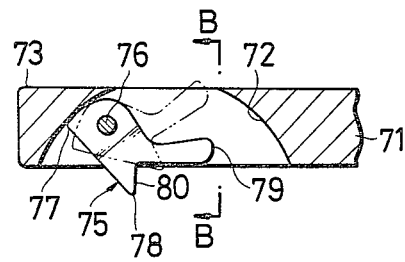
FIGS. 7a and 7b are views similar to FIGS. 5a and 5b of a still further embodiment of the invention.
Figure 7A:
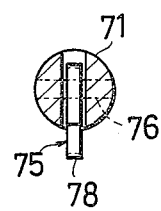

FIG. 7(a) and (b) illustrate an example combining the examples of FIGS. 4 and 5. In this example, a semicircular groove 72 is cut from the body 71 upwardly. The top end of this groove 72 opens and a thick part 73 is formed at the front end of the body 71. The stopping piece 75 is rotatably supported via rivet 76 in the groove 72. The stopping piece 75 is chamfered at the top in a curved form as in FIG. 5 with the hook piece 77 formed at one end, and an engaging stop piece 78 having vertical side 80 and a push-in piece 79 project from an opposite end while the stopping piece 75 is in the stationary state. In this state the engaging stop piece 78 falls vertically by its own weight and at the same time the hook piece 77 is hooked to the inside of the groove 72. When the brace is inserted, the engaging stop piece 78 turns counterclockwise into the groove 72 being pushed by the brace, and the engaging stop piece 78 returns to the vertical position by its own weight after the brace insertion. When for some reason the push-in piece 79 projects from the top opening of groove 72 or when the engaging stop piece 78 does not return to the vertical position, the end surface of brace A presses the push-in piece 79 clockwise at the time of insertion thereby correcting the engaging stop piece 78 and moving it to the vertical position, as shown in FIG. 6.

As stated before, the body 31 is normally a round bar, but a polygon column body may be used according to the shape of the hole of brace A. The body 31 may be formed into various shapes according to the requirements of the frame shape and weld area since it is fixed to the frame of a frame scaffold, e.g., strut side, by welding or other means.

Figure 8:
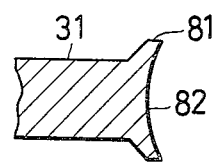
FIGS. 8, 9, 10 and 11 are vertical sectional views showing the shape, and a side end of each bar or body which forms a part of the locking device according to the invention.
Figure 9:
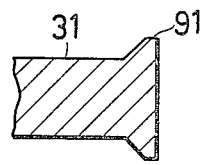
Figure 10:
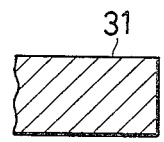
Figure 11:
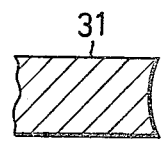

In FIG. 8, flange 81 is formed in the body. The outer side 82 of this flange 81 is formed in semicircular form. It is adapted to the outside of round column, such as tubing, when the frame side is a round column and the weld area is thus extended. In FIG. 9, the weld area is made larger as in FIG. 8. Flange 91 is formed to assure a rigid fixing of the body 31 to the frame side which has a flattened surface, and the outer surface of flange 91 is made horizontal. In FIG. 10, the body 31 is a round bar or square column with the end surface thereof being horizontal. In FIG. 11, the end surface is formed into a circular shape. These shapes may be selected taking into consideration the shape of the frame, weld area, workability and cost factor.

Advantages of this invention are that: (A) the thick part 33, 43 . . . of any desired thickness provided at the front end of the body protects the front end against damage when other object hits that part and prevent the body from being deformed as well as stopping piece 35, 45 . . . and groove 32, 42 . . . from being bent and depressed; (B) stopping piece 35, 45 . . . can always turn smoothly since there is no narrowing nor deformation of groove 32, 42 . . . when rivets 33, 43 . . . are caulked due to a strenghening effect of thick parts 33, 43 . . . ; (C) as shown in FIGS. 3 and 4 when grooves 32, 42 are sealed (top opening), entry of dust and rain from above are prevented with resultant prevention of rust generation over rivets and stopping pieces, prevention of loading and assurance of a smooth turning of stopping pieces 35 and 45 at all times; (D) as shown in FIGS. 5 and 7, when the top of groove 52, 72 is open and stopping piece overrotates and does not return to the original position, push-in piece 59, 79 is naturally pushed in by the brace and correction to the original position can be made; (E) since stopping piece 35, 45 . . . normally projects from the groove vertically and, with the member to be inserted from the front end of the body, the stopping piece turns automatically into the groove under the inserting force thereby eliminating the finger tip correction of the stopping piece with a conspicuous improvement of work efficiency; and (F) in this invention rivets are the same, construction is simple, working is easy and cost is low.

We claim:

1. A gravity locking device for locking a brace having an opening therein comprising:

a bar member having a front end engageable into the brace opening, and a groove spaced from said front end defining a thick bar portion;

a stopping piece rotatably mounted in said groove about a pivot axis which is nearer said bar member front end than a center of gravity of said stopping piece;

said stopping piece having an abutment portion extending from a front end of said stopping piece adjacent said bar member front end, engageable with said groove to hold said stopping piece in a locking position;

said stopping piece further including an engaging stop position defining a vertical surface with said stopping piece in its locking position, extending from a rear end of said stopping piece opposite the front end thereof; and said stopping piece including a projection portion projecting from said stopping piece rear end at an angle to said vertical surface;

said groove extending through said bar member, said engaging stop portion extending from one side of said groove in said stopping piece locking position and projection extendable from an opposite side of said groove with said stopping piece out of its locking position, whereby said projection is engageable by the brace to be locked to rotate said stopping piece into its locking position.

2. A gravity locking device according to claim 1, wherein said groove has curved walls with said groove opening through which said projection portion extends being smaller than said groove opening through which said engaging stop portion extends.

3. A gravity locking device according to claim 2, wherein the curved sides of said groove lie on a circle.

* * * * *